United States Patent
Wyschogrod et al.

(10) Patent No.: US 7,240,040 B2
(45) Date of Patent: Jul. 3, 2007

(54) METHOD OF GENERATING OF DFA STATE MACHINE THAT GROUPS TRANSITIONS INTO CLASSES IN ORDER TO CONSERVE MEMORY

(75) Inventors: Daniel Wyschogrod, Newtown, MA (US); Alain Arnaud, Newton, MA (US); David Eric Berman Lees, Lexington, MA (US); Leonid Leibman, Weston, MA (US)

(73) Assignee: Safenet, Inc., Belcamp, MD (US)

( * ) Notice: Subject to any disclaimer, the term of this patent is extended or adjusted under 35 U.S.C. 154(b) by 847 days.

(21) Appl. No.: 10/217,592

(22) Filed: Aug. 8, 2002

(65) Prior Publication Data

US 2003/0065800 A1 Apr. 3, 2003

Related U.S. Application Data

(63) Continuation-in-part of application No. 10/005,462, filed on Dec. 3, 2001, now Pat. No. 6,856,981.

(60) Provisional application No. 60/357,384, filed on Feb. 15, 2002, provisional application No. 60/322,012, filed on Sep. 12, 2001.

(51) Int. Cl.
*G06F 17/00* (2006.01)
*G06F 7/06* (2006.01)
(52) U.S. Cl. .................. 706/48; 709/231; 709/230; 709/238
(58) Field of Classification Search ........... 709/231, 709/230, 238; 706/48
See application file for complete search history.

(56) References Cited

U.S. PATENT DOCUMENTS 5,151,950 A * 9/1992 Hullender .................. 382/187

(Continued)

FOREIGN PATENT DOCUMENTS

CA 2306364 * 10/2000

(Continued)

OTHER PUBLICATIONS

Hoshino et al., "Online Construction of Subsequence Automata for Multiple Texts", IEEE Symposium on String Procerssing and Information Retrival, Sep. 2000.*

*Primary Examiner*—Anthony Knight
*Assistant Examiner*—Adrian L. Kennedy
(74) *Attorney, Agent, or Firm*—Venable LLP; Jeffri A. Kaminski

(57) ABSTRACT

A method for generating look-up tables for a high speed multi-bit Real-time Deterministic Finite state Automaton (hereinafter RDFA). The method begins with a DFA generated in accordance with the prior art. For each state in the DFA, and for each of the bytes recognized in parallel the following occurs. First an n-closure list is generated. An n-closure list is a list of states reachable in n-transitions from the current state. Next an alphabet transition list is generated for each state. An "alphabet transition list" is a list of the transitions out of a particular state for each of the characters in an alphabet. Finally, the transitions are grouped into classes. That is, the transitions that go to the same state are grouped into the same class. Each class is used to identify the next state. The result is a state machine that has less states than the original DFA.

17 Claims, 13 Drawing Sheets

U.S. PATENT DOCUMENTS 5,317,509 A * 5/1994 Caldwell ........................ 704/9
6,626,960 B1 * 9/2003 Gillam ........................ 715/531
6,742,164 B1 * 5/2004 Gillam ........................ 715/531
6,785,677 B1 * 8/2004 Fritchman ...................... 707/6

FOREIGN PATENT DOCUMENTS

EP    WO 88/01774    *    3/1988

* cited by examiner

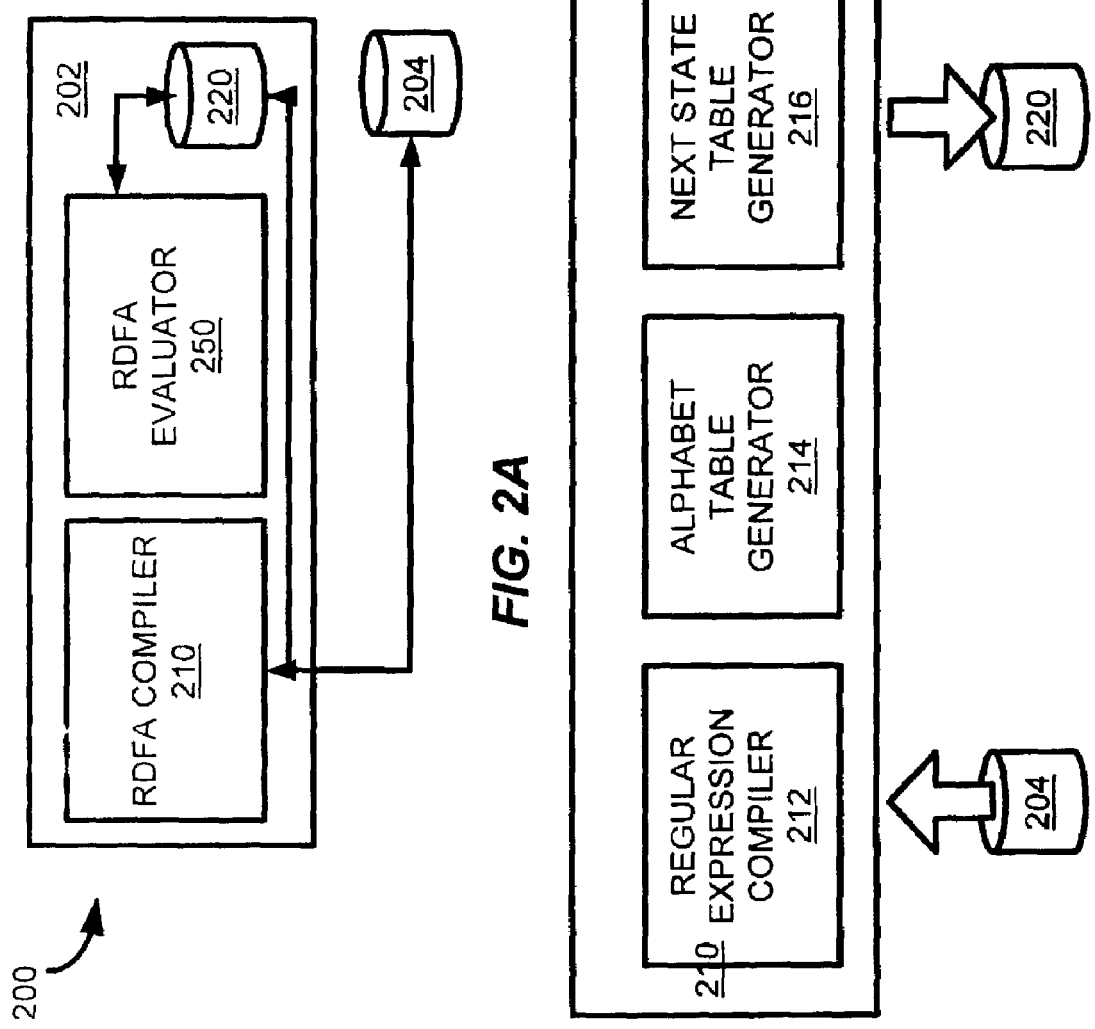

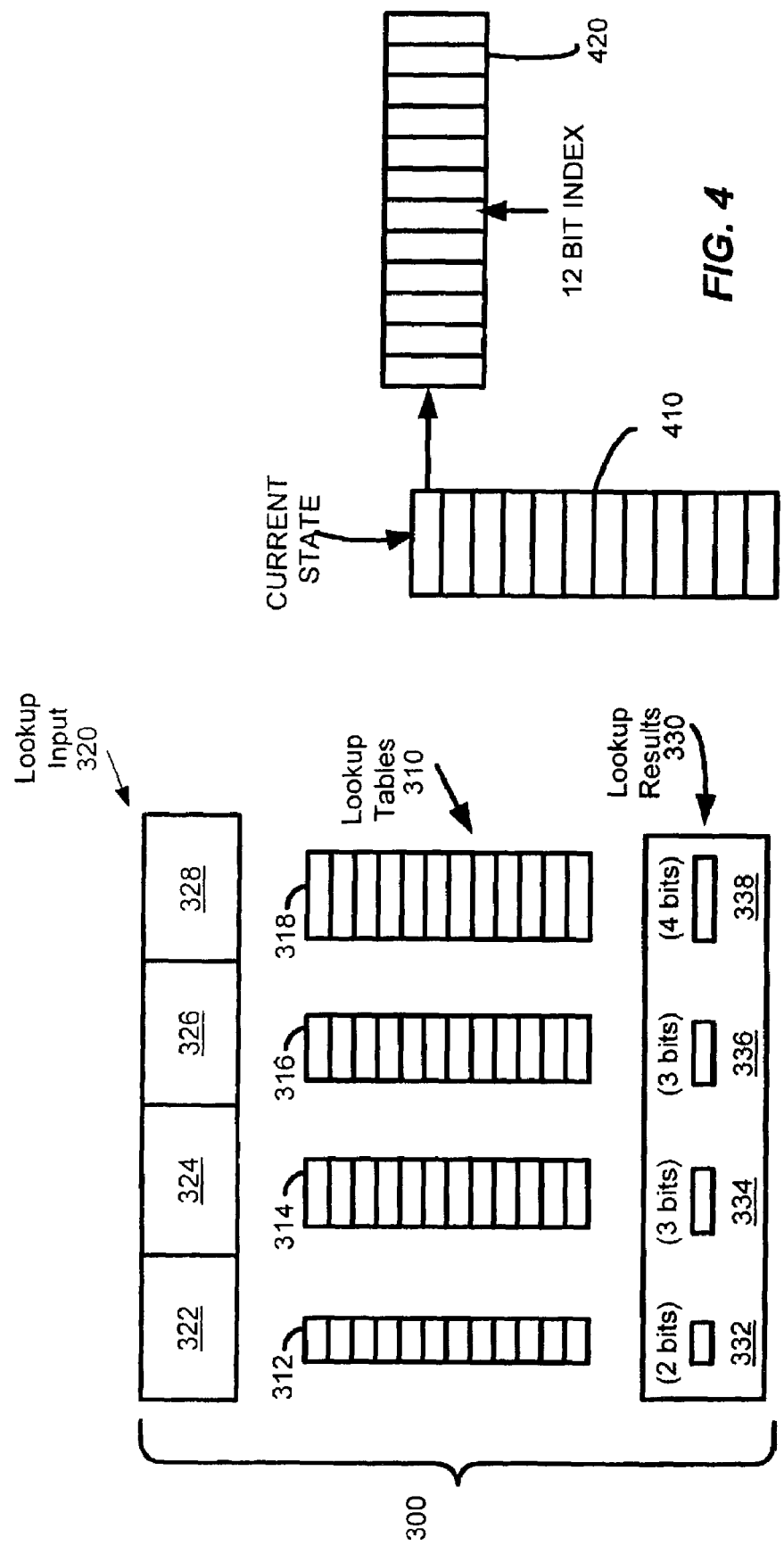

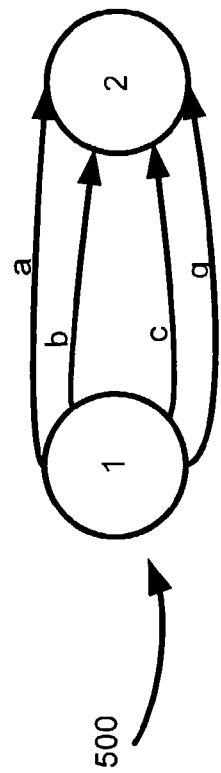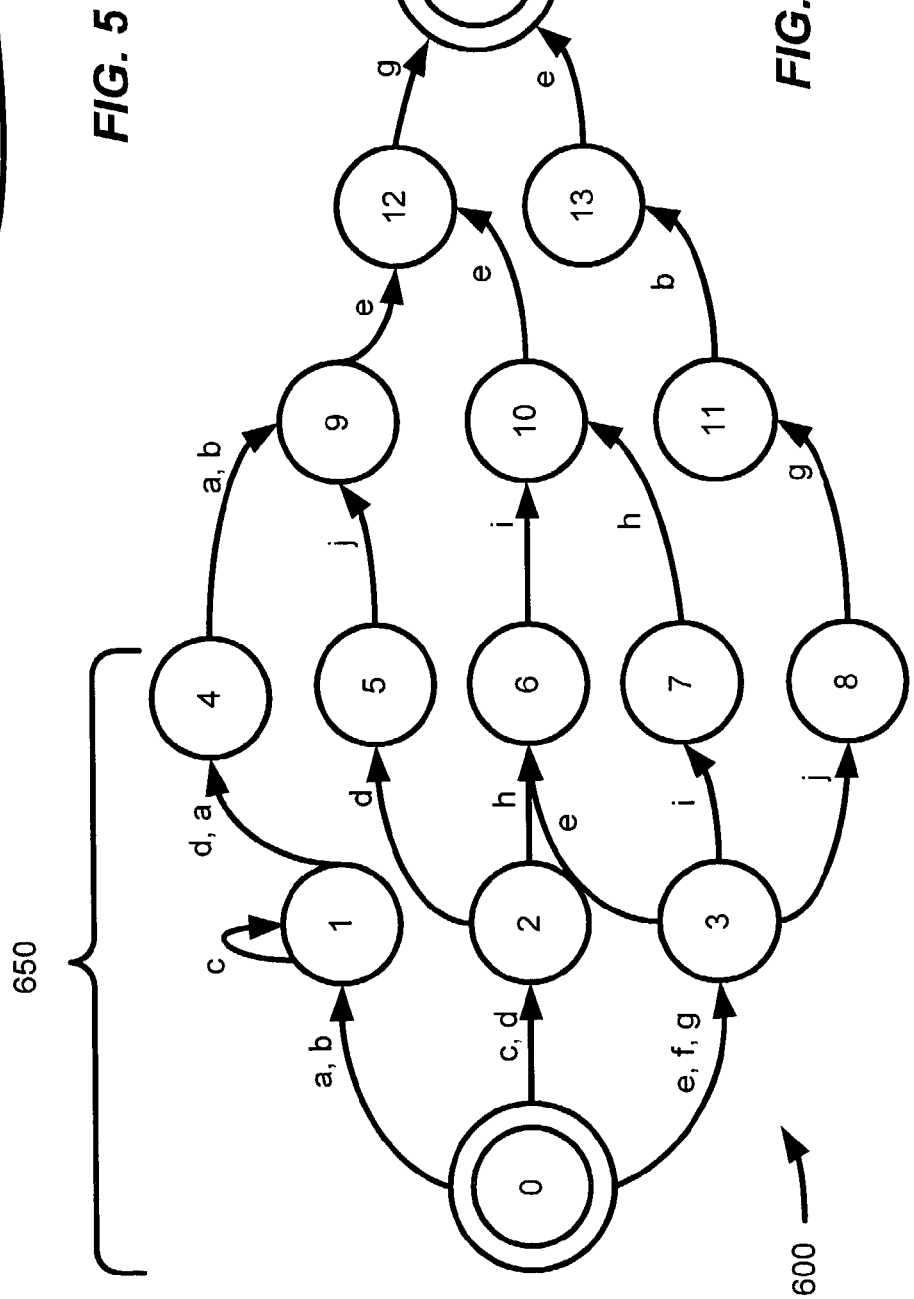

Fig. 6A   Illustration of number of states reachable by 2-closure.
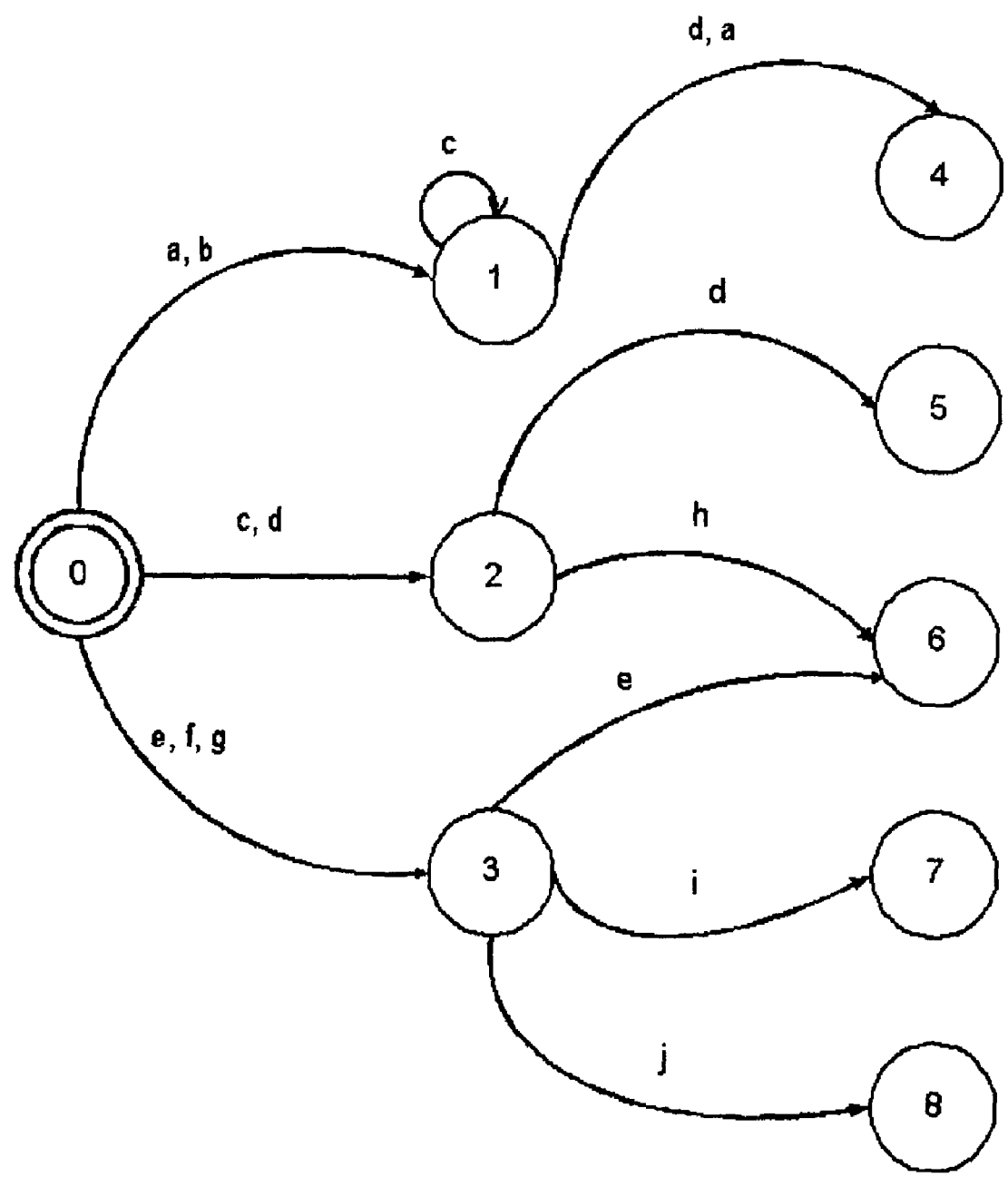

Fig. 7A    DFA for processing 8 characters
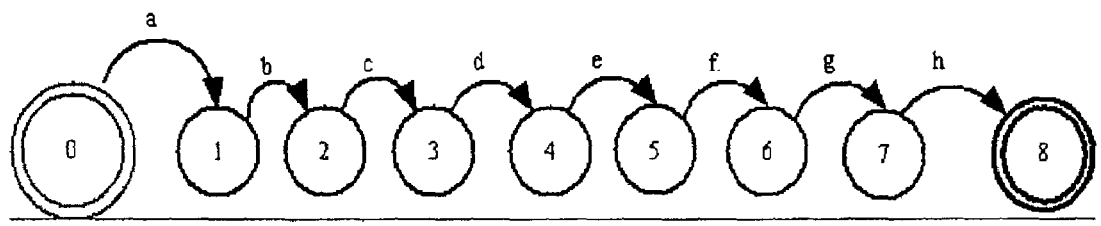
Fig 7B    RDFA for processing 4 bytes in parallel.
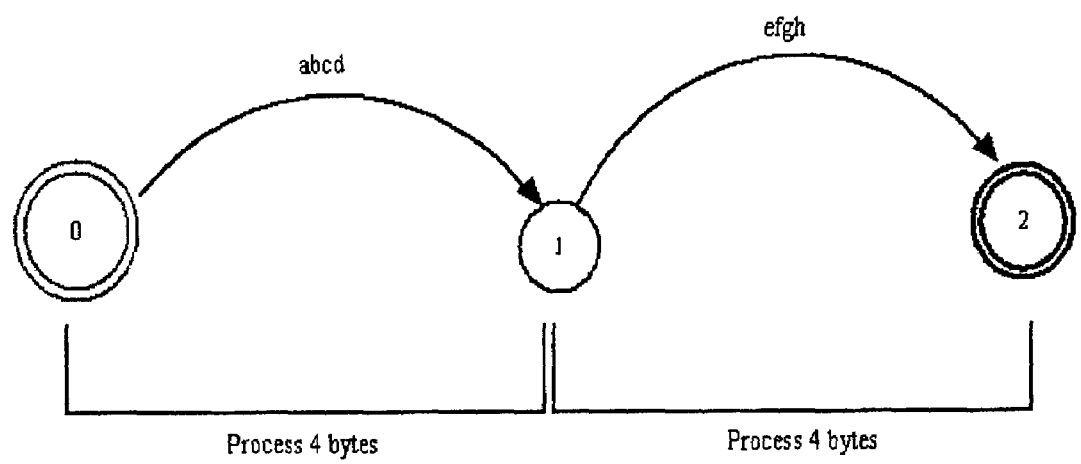

METHOD OF GENERATING OF DFA STATE MACHINE THAT GROUPS TRANSITIONS INTO CLASSES IN ORDER TO CONSERVE MEMORY

RELATED APPLICATIONS

This application is a non-provisional application of provisional applications:
a) 60/322,012 filed Sep. 12, 2001 and
b) 60/357,384 filed Feb. 15, 2002
This application is also a continuation-in-part of application Ser. No. 10/005,462 filed Dec. 3, 2001 now U.S. Pat. No. 6,856,981.
Priority from the above three referenced co-pending applications is claimed and their content including the appendices is hereby incorporated herein by reference.

FIELD OF THE INVENTION

The present invention generally relates to systems and methods for performing, at high speeds, pattern recognition from streams of digital data.

BACKGROUND OF THE INVENTION

With the continued proliferation of networked and distributed computer systems, and applications that run on those systems, comes an ever increasing flow and variety of message traffic between and among computer devices. As an example, the Internet and world wide web (the "Web") provide a global open access means for exchanging message traffic. Networked and/or distributed systems include a wide variety of communication links, network and application servers, sub-networks, and internetworking elements, such as repeaters, switches, bridges, routers and gateways.

Communications between and among devices occur in accordance with defined communication protocols understood by the communicating devices. Such protocols may be proprietary or non-proprietary. Examples of non-proprietary protocols include X.25 for packet switched data networks (PSDNs), TCP/IP for the Internet, a manufacturing automation protocol (MAP), and a technical & office protocol (TOP). Other proprietary protocols may be defined as well. For the most part, messages are comprised of packets, containing a certain number of bytes of information. The most common example is Internet Protocol (IP) packets, used among various Web and Internet enabled devices.

A primary function of many network servers and other network devices (or nodes), such as switches, gateways, routers, load balancers and so on, is to direct or process messages as a function of content within the messages' packets. In a simple, rigid form, a receiving node (e.g., a switch) knows exactly where in the message (or its packets) to find a predetermined type of contents (e.g., IP address), as a function of the protocol used. Typically, hardware such as switches and routers are only able to perform their functions based on fixed position headers, such as TCP or IP headers. No deep packet examination is done.

Software, not capable of operating at wire speed is sometimes used for packet payload examination. This software does not typically allow great flexibility in specification of pattern matching and operates at speeds orders of magnitude slower than wire rate. It is highly desirable to allow examination and recognition of patterns both in packet header and payload described by regular expressions. For example, such packet content may include address information or file type information, either of which may be useful in determining how to direct or process the message and/or its contents. The content may be described by a "regular expression", i.e., a sequence of characters that often conform to certain expression paradigms. As used herein, the term "regular expression" is not limited to any particular language or operating system and it is used in a broad sense. A regular expression may be written in any of a variety of codes or languages known in the art, e.g., Perl, Python, Tcl, grep, awk, sed, egrep or POSIX expressions. Regular expressions may be better understood with reference to *Mastering Regular Expressions,* J. E. F. Friedl, O'Reilly, Cambridge, 1997.

The ability to match regular expressions would be useful for content based routing. For matching regular expressions, a deterministic finite automaton (DFA) or non-deterministic finite automaton (NFA) could be used. The approach used by the present invention follows a DFA approach. A conventional DFA requires creation of a state machine prior to its use on a data (or character) stream.

Generally, a DFA processes an input character stream sequentially and makes a state transition based on the current character and current state. This is a brute-force, single byte at a time, conventional approach. By definition, a DFA transition to a next state is unique, based on current state and input character. For example, in prior art FIG. 1A, a DFA state machine 100 is shown that implements a regular expression "binky.*\.jpg". DFA state machine 100 includes states 0 through 9, wherein the occurrence of the characters 110 of the regular expression effect the iterative transition from state to state through DFA state machine 100. The start state of the DFA state machine is denoted by the double line circle having the state number "0". An 'accepting' state indicating a successful match is denoted by the double line circle having the state number "9". As an example, to transition from state 0 to state 1, the character "b" must be found in the character stream. Given "b", to transition from state 1 to state 2, the next character must be "i".

Not shown explicitly in FIG. 1A are transitions when the input character does not match the character needed to transition to the next state. For example, if the DFA gets to state 1 and the next character is an "x", then failure has occurred and transition to a failure state occurs. FIG. 1B shows part 150 of FIG. 1A drawn with failure state transitions, wherein a failure state indicated by the "Fail" state. In FIG. 1B, the tilde indicates "not". For example, the symbol "~b" means the current character is "not b". Once in the failure state, all characters cause a transition which returns to the failure state.

Once in the accepting state, i.e., the character stream matches "binky.*\.jpg", the receiving node takes the next predetermined action. In this example, where the character stream indicates a certain file type (e.g., ".jpg"), the next predetermined action may be to send the corresponding file to a certain server, processor or system.

While such DFAs are useful, they are limited with respect to speed. The speed of a conventional DFA is limited by the cycle time of memory used in its implementation. For example, a device capable of processing the data stream from an OC-192 source must handle 10 billion bits/second (i.e., 10 gigabits per second, Gbps). This speed implies a byte must be processed every 0.8 nanosecond (nS), which exceeds the limit of current state of the art memory. For comparison, current high speed SDRAM chips implementing a conventional DFA operate with a 7.5 nS cycle time, which is ten times slower than required for OC-192. In addition, more than a single memory reference is typically needed, making these estimates optimistic. As a result, messages or packets must be queued for processing, causing unavoidable delays.

Co-pending application Ser. No. 10/005462 filed Dec. 3, 2001 describes a real time high speed parallel byte pattern recognition system which has relatively low memory storage requirements. The system shown in co-pending application Ser. No. 10/005462 filed Dec. 3, 2001 can be termed a Real-time Deterministic Finite Automaton (hereinafter RDFA). The RDFA is capable of regular expression matching at high speed on characters presented in parallel. The characters may be supplied to the RDFA in serial or parallel; however, the RDFA operates on the characters in parallel. For example, four characters at a time may arrive simultaneously or the four characters may be streamed into a register in the RDFA serially; however, in either case, the RDFA operates on the characters in parallel. In the interest of completeness, the RDFA described in co-pending application Ser. No. 10/005462 filed Dec. 3, 2001 is also described herein.

An RDFA system includes a RDFA compiler subsystem and a RDFA evaluator subsystem. The RDFA compiler generates a set of tables which are used by the RDFA evaluator to perform regular expression matching on an incoming data stream. The present invention is direct to the compiler subsystem which generates the sets of tables.

In the following description the term "n-closure list" means a list of states reachable in n-transitions from the current state. The term "alphabet transition list" means a list of the transitions out of a particular state for each of the characters in an alphabet.

SUMMARY OF THE INVENTION

The present invention provides a method and system for generating look-up tables for a high speed, parallel, multi-byte regular expression matching engine.

The present invention utilizes character classes. Character classes are a compressed representation of the alphabet used in a state machine. Multiple members of the alphabet can be represented by a single class. The use of classes leads to a large reductions in the number of bits required to represent the symbols in the alphabet of symbols, which in turn leads to large reductions in the size of next state lookup tables.

The method and system described herein begins with a DFA generated in accordance with the prior art and it generates two types of tables. The first type of table is a set of Alphabet Lookup Tables and the second type of table is called a Next State Table.

The Alphabet Lookup Tables are generated as follows. Assume the engine handles M bytes simultaneously. For each state in the DFA, the 1-closure to M-closure sets are calculated. For each of the n-closures, all characters that lead from the same state in the n–1-closure to the same state in the n-closure are grouped together, and given a character class number. The Alphabet Lookup Table for a given state maps a character to its class number.

The Next State Table is generated as follows. For a given state, and sequence of M character classes, a unique state of the DFA is reached. The Next State Table takes a current state and a sequence of M character class indices, and produces the next state of the DFA.

Stated differently, the present invention generates a set of next state tables for a state machine using character class codes. The character class codes from the multiple bytes being simultaneously evaluated are concatenated (or otherwise combined) and provide an index to an entry in a next state table which specifies the next state. The next state table is a table of pointers wherein each pointer points to the appropriate next state or each table entry is the value of the appropriate next state. When the next state is identified, this determines the particular set of next state tables used for the next state.

The present invention including its various features may be more fully understood from the following description of embodiments of the invention when read together with the accompanying drawings.

BRIEF DESCRIPTION OF THE DRAWINGS

FIG. 2A is a block diagram of a RDFA system in accordance with the present invention;

FIG. 2B is a block diagram of a RDFA compiler, from the RDFA system of FIG. 2A;

FIG. 3 is a diagram depicting 4 byte parallel processing and 4 corresponding alphabet lookup tables, used by the RDFA evaluator of FIG. 2C;

FIG. 4 is a diagram depicting a next state table, used by the RDFA evaluator of FIG. 2C;

FIG. 5 is a diagram depicting characters that cause the same state transitions, used by the RDFA compiler of FIG. 2B; and FIG. 6 is a diagram depicting a state machine used by the RDFA compiler of FIG. 2B.

FIG. 6A illustrates a number of states reachable by 2-closure.

FIG. 7A illustrates a DFA for processing 8 characters.

FIG. 7B illustrates an RDFA for processing 4 bytes in parallel.

DETAILED DESCRIPTION OF PREFERRED EMBODIMENTS

The preferred embodiment of the invention can be used with a system and method which determines in real-time whether a set of characters in a data stream satisfies one or more of a set of predetermined regular expressions.

The data stream may be received by a typical computer and/or network device, such as a personal computer, personal digital assistant (PDA), workstation, telephone, cellular telephone, wireless e-mail device, pager, network enabled appliance, server, hub, router, bridge, gateway, controller, switches, server load-balancers, security devices, nodes, processors or the like. The data stream may be received over any of a variety of one or more networks, such as the Internet, intranet, extranet, local area network (LAN), wide area network (WAN), telephone network, cellular telephone network, and virtual private network (VPN).

The RDFA compiler subsystem in accordance with the present invention generates a DFA state machine from a user specified regular expression. The DFA state machine is optimized to include a minimum number of states, in accordance with known techniques. Define the number of bytes to be processed in parallel as M. For each state in the state machine, the RDFA compiler determines those characters, represented by bytes, that cause the same transitions. Those characters that cause the same transitions are grouped into a class. Therefore, each class, for a given current state of the state machine, includes a set of characters that all cause the same transitions to the same set of next states. Each class is represented by a class code. The number of bits required for a class code is determined solely from the number of classes at a given state and byte position.

During parallel evaluation, the RDFA evaluator selects the next M bytes and gets the appropriate M lookup tables to be applied to the bytes under evaluation. Each byte is looked up in its corresponding lookup table to determine its class code. As previously mentioned, the class codes are concatenated. Given a current state, the RDFA evaluator retrieves the appropriate next state table. The code resulting from concatenation of the class code lookup results is applied as an index to the selected next state table to determine the next state which involves M transitions beyond the current state.

This process continues until evaluation is terminated or the regular expression is satisfied. The process may be terminated when, for example, the bytes under evaluation do cause a transition to a failure state. With a regular expression satisfied, the next action may be determined by the RDFA system, or by a system interfaced therewith.

Figure 1A:
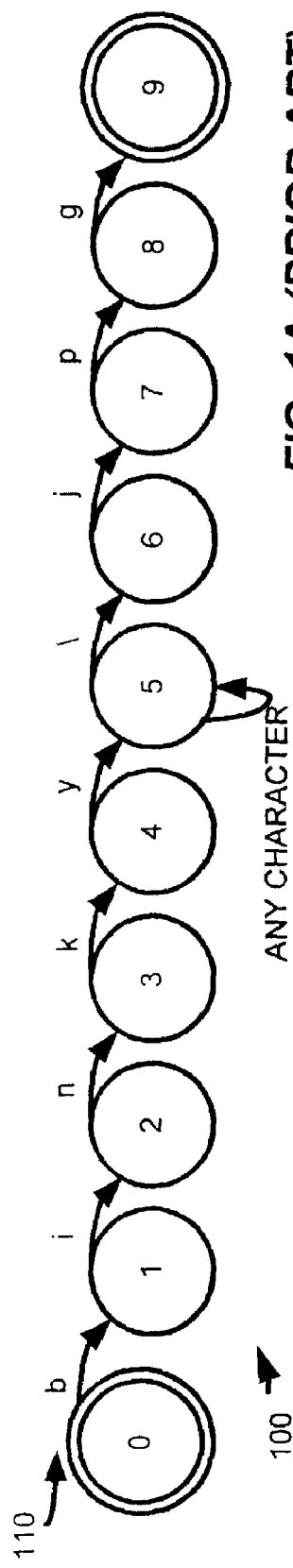
FIG. 1A is a state diagram implementing a regular expression, in accordance with the prior art.
Figure 1B:
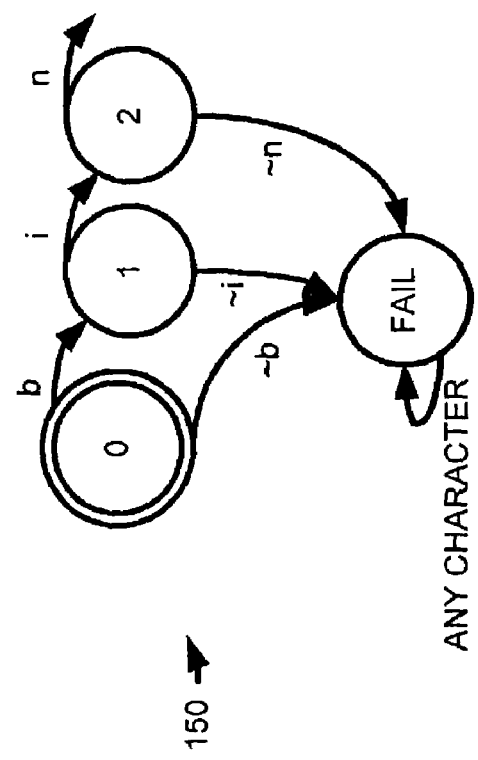
FIG. 1B is a portion of the state diagram of the regular expression of FIG. 1A, including a failure state.
Figure 2C:
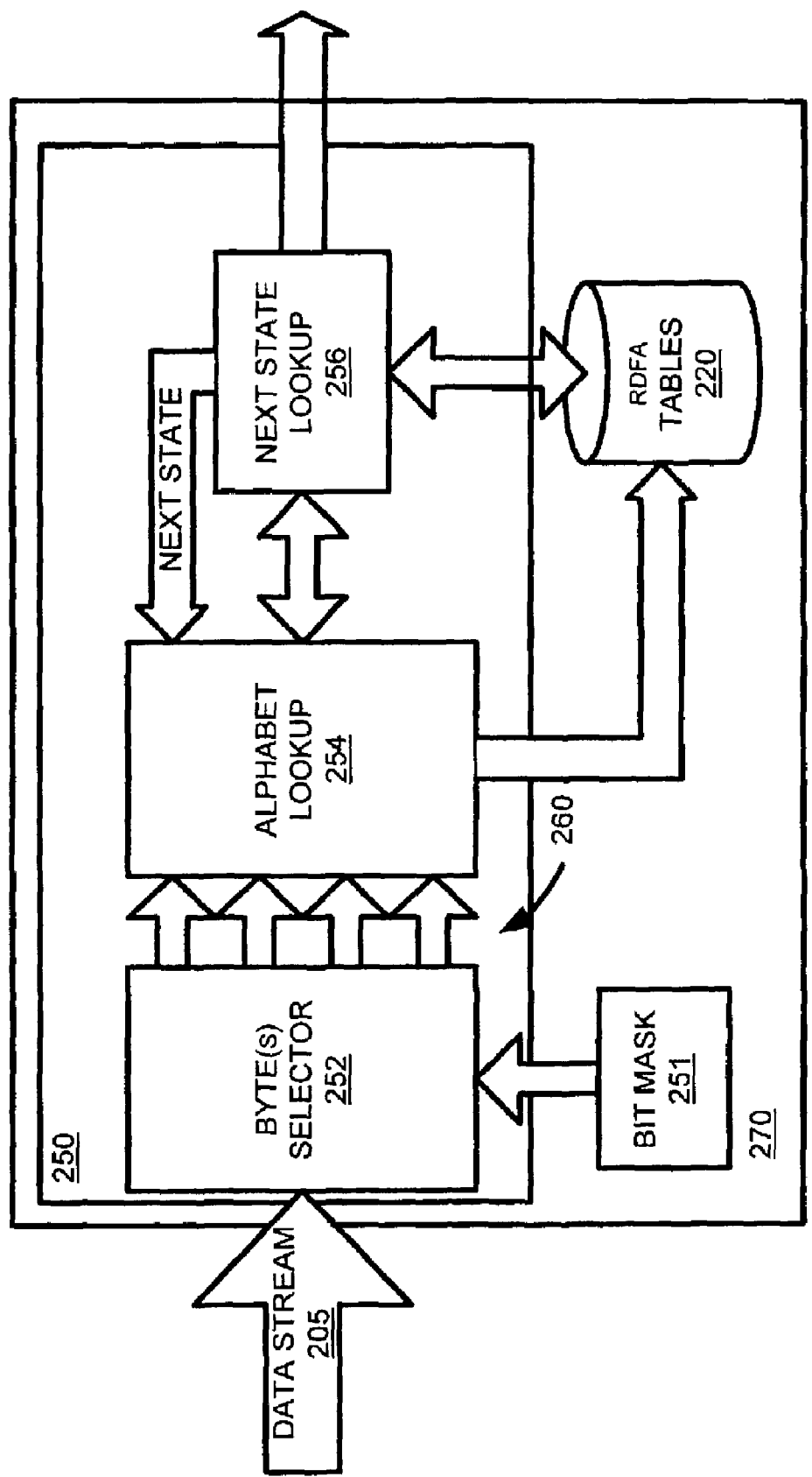
FIG. 2C is a block diagram of a RDFA evaluator, from the RDFA system of FIG. 2A.

FIG. 2A shows a preferred embodiment as RDFA system 200. System 200 includes two subsystems. The first subsystem is a RDFA compiler 210 that performs the basic computations necessary to create tables for subsequent real-time pattern recognition. The second subsystem is a RDFA evaluator 250 that performs the evaluation of characters using the RDFA tables created by the RDFA compiler 210. FIG. 2B shows the major components in the RDFA Compiler Subsystem. FIG. 2C shows the major components in the RDFA evaluator 250. The present invention is directed to generating lookup tables that group transitions into classes and which therefore utilizes significantly less memory than do prior DFA state machines.

The RDFA system 200 includes a first memory 220 for high speed access by RDFA evaluator 250 during evaluation of characters from the data stream. This first memory 220 consists of on-chip or off-chip memory or any combination thereof. A second memory 204 includes the initial one or more regular expressions of interest, and need not lend itself to high speed access, unless required as a function of a particular application to which the RDFA is applied.

As will be discussed in more detail below, the RDFA compiler 210 includes a regular expression compiler 212 that converts a regular expression, from memory 204, into an optimized state machine. An alphabet lookup table generator 214 generates, from the regular expression and the state machine, a series of state dependent alphabet lookup tables. The alphabet lookup tables include codes associated with each character in an applicable alphabet of characters. These alphabet lookup tables are stored in high speed memory 220. During RDFA data stream processing (i.e., character evaluation), a character represented by a byte under evaluation is looked up in a corresponding alphabet lookup table to determine its state dependent code, as will be discussed in greater detail.

A next state table generator 216 generates a table of next states of the state machine to be applied during evaluation of a set of characters, wherein next states are determined as a function of a current state and the character codes from the alphabet lookup tables. The next state table is also preferably stored in high speed memory 220.

FIG. 2C is a functional block diagram of the RDFA evaluator 250. The RDFA evaluator 250 includes several functional modules that utilize the alphabet lookup tables and next state tables generated by the RDFA compiler 210. At a top level, a byte selector module 252 captures the requisite number of bytes (i.e., M bytes) from an incoming data stream 205. An optional bit mask 251 can filter the input stream to select words from predetermined positions, allowing the processing to ignore certain portions of the input stream. Each bit in the mask corresponds to a four byte section of a packet for this embodiment. The selected bytes are taken and processed in parallel by an alphabet lookup module 254, which selectively applies the alphabet lookup tables from memory 220 to determine a character class code for each byte. As will be discussed in greater detail, characters causing the same state transition are grouped in classes, which are represented in alphabet lookup tables as class codes of a certain bit width. The alphabet lookup module 254 concatenates the class codes obtained from the lookup tables and passes the concatenated code to a next state module 256. The next state module 256 selectively applies the concatenated class codes to the appropriate next state table from memory 220, given a current state, to determine a next Mth state in a corresponding state machine. This process continues at least until a failure state or accepting state is achieved.

The RDFA evaluator 250, as well as the RDFA compiler 210, may be implemented in hardware, software, firmware or some combination thereof. In the preferred form, the RDFA evaluator 250 is a chip-based solution, wherein high speed memory 220 may be implemented on chip 270. Memory 204 may also be on-chip memory or it may be off-chip memory, since high-speed is typically not as vital when generating the RDFA. However, if high-speed is required the RDFA compiler 210 and memory 204 may each be on-chip. Therefore, preferably, to achieve higher speeds the primary functionality of RDFA evaluator 250 for processing incoming data streams is embodied in hardware. The use of pointers to next state tables, rather than directly using the alphabet table lookup results, allows flexibility in memory management. For example, if on-chip and off-chip memory is available, then pointers can be used so that more frequently used memory is on-chip, to speed up RDFA performance. The RDFA expression compiler 210 will determine the amount of memory required. This allows the user to know if a particular set of rules will fit in the on-chip memory. Thus, memory related performance can be accurately known ahead of time.

RDFA system 200 constructed in accordance with the present invention requires relatively modest amounts of high speed or on-chip memory 220, certainly within the bounds of the amount which is currently readily available. Memory 220 is used to store the alphabet lookup tables and next state tables for a given regular expression.

Unlike a conventional (i.e., single byte at a time processing) DFA approach, a RDFA is configured for scalable parallel processing. As a general rule, increasing the number of bytes (M) processed in parallel yields increasingly greater processing speeds, subject to the limitations of other relevant devices. In the preferred embodiment provided herein, the RDFA evaluator 250 processes four (4) bytes in parallel (i.e., M=4); however, there is no inherent limitation to the number of bytes that can be processed in parallel.

Data Stream Evaluation

FIG. 3 illustrates the multiple alphabet lookup table concept 300 for a set of 4 bytes 320, which are selected from the data stream 205 by byte selector 252 and are taken as parallel input 260 by alphabet lookup module 254 (see FIG. 2C). Each byte represents a character (e.g., a number, a letter, or a symbol) from the permitted alphabet. In the preferred embodiment, a separate alphabet lookup table having 256 elements is defined for each of the 4 bytes and each state and is stored in memory 220. The alphabet lookup tables 310 are formed and applied as a function of a current state of a state machine that represents the regular expression.

In the example of FIG. 3, a first alphabet lookup table 312, having a 2 bit width, is used to lookup a first byte 322. A second alphabet lookup table 314, having a 3 bit width, is used to lookup a second byte 324, and so forth with alphabet tables 316 and 318 and third byte 326 and fourth byte 328, respectively. The elements of the alphabet lookup tables 310 are related to state transitions for a corresponding state machine that models the regular expression. Accordingly, the selection and application of alphabet lookup tables 310 is a function of the current state of the state machine. The current state is the last state resulting from the processing of the previous 4 characters, if any. Thus, a different set of alphabet lookup tables is used for each current state.

The widths of the table entries for each byte can vary from one state to the next, depending on the regular expression and the current state of the corresponding state machine. In the FIG. 3 example, the table widths in bits are 2 bits for table 312, 3 bits for table 314, 3 bits for table 316, and 4 bits for table 318. The table widths in another state might be 1 bit, 1 bit, 2 bits, and 4 bits, as an example. For instance, if for the first byte there are only two possible character classes, then the width of the alphabet lookup table for that bit need only be 1 bit. The current state is stored in memory (e.g., on-chip memory 220) for use in determining which alphabet lookup tables to apply to the 4 bytes 320 and for determining a next state.

For each of the 4 bytes 320, using lookup tables 310 a different class code is obtained by alphabet lookup module 254. As previously discussed, the characters are grouped into classes according to the state transitions the characters cause and codes associated with those classes (i.e., class codes) are represented in the alphabet lookup tables. Therefore, if byte 322 represents the character "a", alphabet lookup module 254 finds the element in alphabet lookup table 312 that corresponds to "a" and obtains the class code stored at that element (e.g., class code 01). This is done for each other byte (i.e., bytes 324, 326 and 328) using their respective alphabet lookup tables (i.e., tables 314, 316 and 318).

The lookup table class codes for each of the 4 bytes are concatenated together, which for the FIG. 3 example produces a 12 bit result (i.e., 2+3+3+4 bits). As an example, assume that from lookup tables 310 of FIG. 3 resulted a 2 bit word "01" from table 312, a 3 bit word "001" from table 314, a 3 bit word "011" from table 316, and a 4 bit word "0000" from table 318. The resulting 12 bit concatenated word would be "010010110000".

As is shown in FIG. 4, the current state of the state machine is used as an index into a table of pointers 410. Table 410 is defined as a function of the regular expression's state machine, so each current state has a corresponding table to possible next states. Each pointer in table 410 points to a linear (i.e., 1 dimensional (1-D)) table 420 of next state values (or a "next state table") and the 12 bit concatenated result of the parallel alphabet lookup is used as an offset or index into the selected next table 420. Therefore, a next state value is selected from next state table 420 as a function of the current state and the concatenated 12 bit word. The selected next state value corresponds to the new next state. The next state determined from evaluation of the 4 bytes serves as the current state for evaluation of the next set of 4 bytes.

In the preferred form, the selected next state table value includes a terminal state code (e.g., with higher order bit set to 1) that indicates whether or not we have passed through an accepting state (or terminal state) within the M states we have just traversed. Generally, a terminal state is a state the process enters when processing from a data stream with respect to a certain one or more regular expressions is completed; i.e., it is indicative of termination of processing with respect to the one or more regular expressions. For example, in the preferred embodiment a high order bit associated with one or more of the bytes under evaluation is set to "1" upon transition into a terminal state. In one embodiment, the hardware stores the word (i.e., the 4 bytes under evaluation) for which the terminal state occurred and the corresponding offset from the lookup table (i.e., the 12 bit concatenated word). Thereafter, post-processing software may use the stored data to determine at which of the 4 bytes the regular expression terminated. This is useful in many situations where only a small number of regular expression matches occur per packet, so the number of such determinations is relatively small. In another embodiment, the codes (i.e., the 4 bytes and 12 bit word) are stored in a secondary terminal state table, which allows the hardware to directly determine which byte terminated the processing. The benefit of allowing the hardware to make such determinations is that it can be accomplished much more quickly in hardware, which is a significant consideration in high speed, real-time processing.

In accordance with the preferred embodiment, only three (3) memory operations are required to process the 4 bytes. They are: (i) find characters in lookup tables 310; (ii) find pointer in table 410; and (iii) get next state indices from next state table 420. Further, these operations may be easily pipelined by performing the character table lookup at the same time as the last 4 byte result is being looked up in the next state table to allow improved processing times, with the only significant limitation being the longest memory access.

The benefits of the preferred embodiment can be further appreciated when the RDFA memory requirements are compared with those of a naïve DFA approach, where the lookup is applied to a 4 byte word. In this type of DFA parallelization, 4 bytes would be looked up in parallel. This would require a table having $256^4$ entries, which is about 4.295 billion entries, and a word (4 byte) cycle time of 3.2 nS in order to keep up with OC-192 rates (i.e., 10 Gb/sec). Such a system is impractical to implement with current or near-term memory technology, based on the speed and size required to keep up with OC-192 rates. Further, such a large amount of memory cannot presently be implemented on-chip, so a significant amount of off-chip memory would be required, unacceptably slowing the process. Compare the memory requirement of simple DFA parallelization with the greatly reduced amount of memory used in the preferred embodiment of the RDFA system 200. Note that the naïve DFA parallelization requires many orders of magnitude greater memory size than an RDFA system 200, in accordance with the present invention.

Figure 4A:
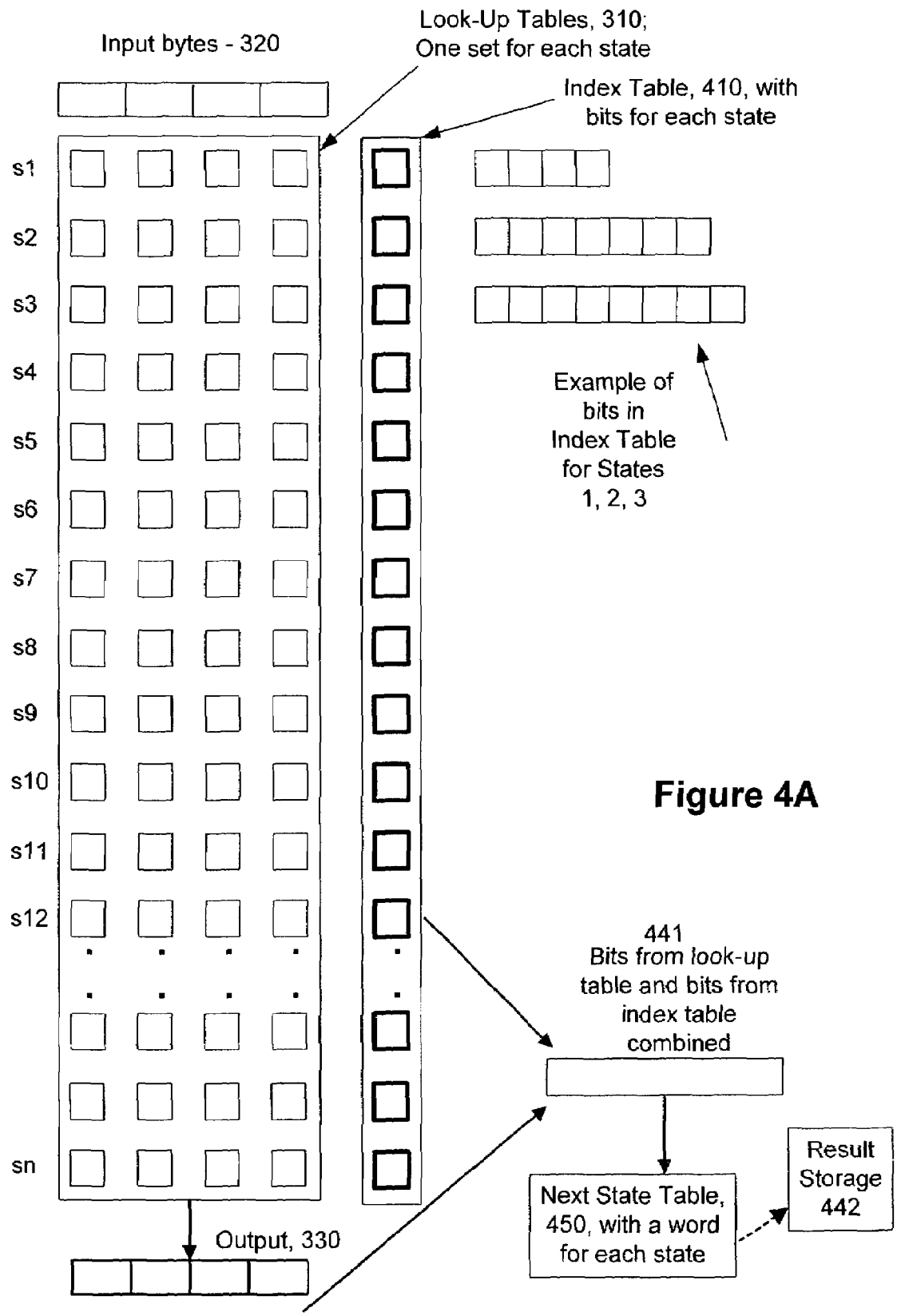
FIG. 4A is a diagram indicating the flow of data from the character tables, the index table and memory.

FIG. 4A is another illustration of the alphabet lookup tables 310, the index table 410, and the next state table 450 showing their operation and interactions. The bytes which are being examined are designated 320. Bytes 320 are a four byte segment from a data stream (i.e. four bytes from a data packet that is being examined). The alphabet lookup tables 310 have a segment associated with each possible state of the state machine. In FIG. 4A the states are designated s1, s2, s3, etc. along the left side of the figure. In each state, the bytes 320 are used to interrogate the section of table 310 associated with that particular state. The lookup operation produces a multi-bit result 330. The number of bits in the result 330 (i.e. the number of bits retrieved or generated by the alphabet lookup table) is a function of the particular bytes 320, the particular state, and the byte position. The index table 410 has an entry for each state. Each entry in table 410 includes a code which tells the system how many bits to retrieve from the output of the lookup table 310 for that particular state. (Note in an alternate embodiment this code is stored in a separate table that has a location for each state similar to table 410). During any particular state conventional addressing circuits address and read the contents of the location in table 410 associated with the particular state. The result bits 330 and the bits in the current state position of the index table 410 are concatenated to produce a memory address 441. As indicated at the left side of FIG. 4A, different locations in index table 410 have a different number of bits. The number of bits in concatenated result 441 (i.e. total number of bits from table 410 and result 330) is always a fixed number. In the preferred embodiment that number is 13. The number of bits equals the number of bits in a memory address for the particular system. Thus, for each state the associated location in table 410 indicates how many bits should be retrieved from table 310 and it provides a series of bits so that there is a total of 13 bits for address 441.

Address 441 is the address of an entry in the next state table 450. The memory address 441 is used to interrogate next state table 450 utilizing conventional memory addressing circuitry. The entry in next state table 450 at address 441 indicates the next state. The entry in the next state table 450 may also contain a flag which indicates that the operation has reached a special point such as a termination point.

The operations proceed until the flag in the next state table indicates that the operation has reached a termination point or that the bytes have been recognized or matched. When a match is found, processing the bytes in a particular packet can then either terminate or the system can be programmed to continue processing other sets of bytes 320 in an attempt to find other matching patterns.

If the next state table does not indicate that the operation has terminated, the process proceeds to the next state and the process repeats. If the process repeats the information in the appropriate next state table 450 is used. That is, the designation of the next state in table 450 is used to generate the address of an appropriate section of lookup table 310 and the process repeats. Upon reaching a termination state, the following data is saved in memory registers 442:

1. Pointer to the word (4 bytes) in the packet at which the terminal state occurred.

2. The table offset (computed from the alphabet table lookups results and index table) into the next-state table.

The saved data can be used by post processing operations which determine what action to take after the operation has terminated. In some embodiments when a termination flag is encountered which indicates that a match is found, the operation continues, that is, additional bytes in the string is are processed in an effort to locate another match to the specified regular expression.

In general after four bytes have been processed, four different bytes are streamed into register 320 and the process repeats. Furthermore, one can search for a wide array of different patterns. A target pattern can be more than four bytes long. For example if one is searching for a five byte pattern, after four of the bytes have been located another set of four bytes can be streamed into register 320 to see if the fifth byte is at an appropriate location.

Co-pending application Ser. No. 10/005462 filed Dec. 3, 2001 includes an appendix on a CD containing a specific example of the data that would be stored in table 310, 410 and 450 so that the system would proceed through a series of states to locate the character string "raqia". The entire appendix from co-pending application Ser. No. 10/005462 filed Dec. 3, 2001 is hereby incorporated herein by reference.

It is noted that each different set of regular expressions which one wants to locate require a different set of data in tables 310, 410 and 450. The example given is an example that contains 5 particular characters in sequence. It should however be understood that the invention can be used to locate any desired regular expression, not just fixed character sequences. The specific data for tables 310, 410 and 450 given in the referenced appendix are for locating or recognizing the particular character sequence "raqia". The data files in the referenced appendix are designated as follows: (a) the data for the four byte positions for table 310 are designated: _hwct_0.txt, _hwct_1.txt, _hwct_2.txt, hwct_3.txt. (b)The data for index table 410 is designated_it.txt. (c) The data for the next state table 450 is designated_nst.txt.

In the specific example provided in the referenced appendix, the tables provide for 32 states of operation. The four tables 310 each have 32 sections each with 256 entries for a total of 8192 entries. The index table has 32 entries. It is noted that the choice of 32 states is matter of engineering choice for the particular application. In the particular example given in the referenced appendix, the next state table 450 has 8192 entries. It is noted that the number of entries in this table is also a matter of choice. The number of entries in the next state table for each state is determined by the number of combinations of character classes for that state for all the byte positions. For example, if the number of character classes for byte positions 0 through 3 are 4, 4, 8, 8 respectively, then the total number of next state table entries for that state is 4×4×8×8=1024. The total size of the address space for all the states is the sum of the table sizes for each state. In one embodiment the number of character classes at each byte position is a power of 2, but other embodiments use various different numbers of character classes.

It should be noted that for each state, there is a table for each of the bytes that are being simultaneously evaluated. In the described embodiment four characters are being simultaneously evaluated, hence there are four tables for each state. Each table has an entry for each member of the alphabet being used. For example, if the alphabet is the ASCII alphabet, there would be 256 entries in each table.

It should be noted that while in the embodiment described, four bytes are processed in parallel, alternate embodiments can be designed to handle different numbers of bits in parallel. For example other embodiments can handle 1, 2, 6, 8, 12 bytes in parallel.

Creation of the RDFA Tables

To generate a RDFA in accordance with the present invention, the regular expression compiler 212 converts a regular expression from memory 204 into a DFA. The regular expression compiler 212 may also optimize the DFA to minimize the number of states. These processes are known in the art, so are not discussed in detail herein. The regular expression compiler is also configured to determine the amount of memory required to store the RDFA for a given regular expression, as will be discussed in further detail below. This allows the user to know if a particular set of rules (i.e., regular expressions) will fit in the on-chip memory. Thus, performance can be accurately predicted.

The regular expression compiler 212 also reduces state transition redundancy in the alphabet representing the input data stream by recognizing that DFA state to state transition decisions can be simplified by grouping characters of an alphabet according to the transitions they cause. The list of states that may be reached in a single transition is referred to as '1-closure'. The term "n-closure" is defined as the list of states reachable in n transitions from the current state. n-closure is readily calculated recursively as the list of states reachable from the n−1 closure. There may be more than one character that causes the same transitions to the same n-closure set. In such a case, characters may be grouped into classes according to the set of next state transitions they cause. Rather than representing individual characters, each class may be represented in a 1, 2, 3, or 4 bit code, for example. In this manner, the applicable alphabet is represented in an extremely economical form.

Even very complicated expressions can achieve significant compression in the number of bits required to represent its alphabet by mapping to character classes. For example, a portion of a regular expression represented as "(a|b|c|g)" can be represented in a state transition diagram 500, shown in FIG. 5, wherein the expression indicates "a" or "b" or "c" or "g". These characters all cause a transition from state "1" to state "2", therefore, these characters can all be mapped into a single class. If all other characters cause a transition to a failure state, then all of those characters can be grouped into a second class. Therefore, when in state 1 of FIG. 5 (i.e., state 1 is the current state) all transitions can be represented with a 1 bit code, wherein a code of "1" could indicate a transition into state "2" and a code of "0" could indicate a transition into a failure state F (not shown). Mapping characters into classes eliminates the need to represent characters with 8 bits, as is typical with conventional approaches.

Alphabet lookup tables are generated by the alphabet table generator 214 of FIG. 2B. In the present invention, the RDFA alphabet lookup tables reflect the classes that represent the state transitions, wherein the 1, 2, 3, or 4 bit representation, as the case may be, are embodied in character classes related to the current state. In general, when M bytes are processed in parallel a separate alphabet lookup table is computed for each of the M bytes. Further, a different set of tables is computed for each state in the state machine. Thus, if a state machine has L states and M bytes are processed in parallel, a total of (L×M) alphabet lookup tables are produced, in accordance with the preferred embodiment.

The algorithm used to produce the M character class tables for a regular expression state machine from a starting state S, is as follows. The nth alphabet lookup table (where $1 \leq n \leq M$) uses the previously computed n−1 closure and then computes the n-closure. Then, for each character in the alphabet, a list of non-failure state transitions from the n−1 closure to the n-closure is generated. An alphabet mapping is then initialized by placing the first character in the alphabet into character class 0. The transition list for the next letter in the alphabet, for a given regular expression and a given set of n to n−1 closure transitions, is examined and compared with the transitions for the character class 0. If they are identical, then the character is mapped to class 0, otherwise a new class called "class 1" is created and the character is mapped to it. This process proceeds for each character in the alphabet. So, if a list of transitions for a character matches the transitions for an existing class, then that character is represented in that existing class, otherwise that character is the first member of a new class. The result of this process is a character class number associated with each character in the alphabet. The total number of classes for a particular lookup table may be represented by P. Then, the number of bits necessary to represent each symbol is given by:

$$Q = \text{floor}(\log_2 P) + 1$$

Q is also the width of the table entries in the alphabet lookup table (e.g., 1, 2, 3, or 4 bits). For example, in alphabet lookup table 312 of FIG. 3, Q=2. Note that Q is computed for each alphabet lookup table separately and varies as a function of both state and byte position.

This concept may be appreciated with a simple example for processing 2 bytes in parallel (i.e., for M=2) for the portion 650 of a state machine 600 shown in FIG. 6. This example focuses primarily on lookup tables and transitions from the 0 state. State machine 600 is derived from a predefined regular expression. The 1-closure for state 0 is (1, 2, 3, F), where the failure (or terminal) state may be denoted by symbol F (not shown). That is, as can be seen from FIG. 6, from state 0, non-failure transitions may be to state 1, state 2, or state 3. Table 1 provides a list of state transitions out of state 0 for an alphabet consisting of letters from "a" to "k", in accordance with the state diagram 600 of FIG. 6.

TABLE 1

| Transitions for State Diagram 600, From State 0 | |
|---|---|
| Letter | Transitions |
| a | 0 ⇒ 1 |
| b | 0 ⇒ 1 |
| c | 0 ⇒ 2 |
| d | 0 ⇒ 2 |
| e | 0 ⇒ 3 |
| f | 0 ⇒ 3 |
| g | 0 ⇒ 3 |
| h | ∅ null (or F state) |
| i | ∅ null (or F state) |
| j | ∅ null (or F state) |
| k | ∅ null (or F state) |

Upon inspection, Table 1 shows that the alphabet maps to 4 different equivalent classes, meaning that 2 bits are sufficient for the width of an alphabet lookup table for a current state of state 0. Therefore, with regard to a current state 0, the following classes may be formed: class 0 (a, b), class 1 (c, d), class 2 (e, f, g,) and a failure state class 3 (h, i, j, k).

In the corresponding alphabet lookup table, class 0 may be represented as "00", class 1 as "01", class 2 as "10", and class 3 as "11" as follows:

TABLE 2

Lookup Table Entries, Current State 0

| Letter | Class Code In Alphabet Lookup Table |
|---|---|
| a | 00 |
| b | 00 |
| c | 01 |
| d | 01 |
| e | 10 |
| f | 10 |
| g | 10 |
| h | 11 |
| i | 11 |
| j | 11 |
| k | 11 |

The 2-closure for state machine 600 is (1, 4, 5, 6, 7, 8, F) from state 0. Similarly, Table 3 is a list of state transitions for each character for the 2-closure. In this case, inspection of Table 3 shows the alphabet maps to 8 equivalent character classes, so that 3 bits are required for the table width. Note that as indicated in the Q value calculation, if the number of equivalent characters had been 5, the table width would still be 3 bits.

TABLE 3

Transitions For State Diagram 600, From State 0

| Letter | Transitions |
|---|---|
| a | 1 ⇒4 |
| b | Ø null (or F state) |
| c | 1 ⇒1 |
| d | 1 ⇒4 |
|   | 2 ⇒5 |
| e | 3 ⇒6 |
| f | Ø null (or F state) |
| g | Ø null (or F state) |
| h | 2 ⇒6 |
| i | 3 ⇒7 |
| j | 3 ⇒8 |
| k | Ø null (or F state) |

The next state table generator 216 of FIG. 2B generates, for each state in the state machine (as a current state), a list of next states represented in next state tables (e.g., next state table 420 of FIG. 4). Therefore, for each current state, there is a one-dimensional (1-D) list of possible next states. Using state machine 600 of FIG. 6, assume the current state is state 0 and M=4 (where M is the number of bytes processed in parallel). As was discussed with respect to states 0 through 3 above, and shown in Tables 1-3, the characters that cause state transitions can be mapped into classes. The corresponding next state table is comprised of entries that dictate the next state given the class codes of the four characters (or bytes) under evaluation from the alphabet lookup tables.

Assume 4 bytes were received representing the 4 characters "c, h, i, e". As mentioned previously, the class code for "c" with a current state 0 is 01. The class code for "h" is 3 bits, as the second of 4 bytes assume its class code is 011. Also, assume for a current state 0 and as the third of 4 bytes, the class code for "i" is 0011. Finally, assume for a current state of 0 and as the fourth byte, the class code for "e" is 101. The corresponding next state table, will have a next state value corresponding to state 12, given the above class codes for the 4 bytes and a current state 0. In the preferred form, the class codes are concatenated (e.g., 010110011101) to form an index into the next state table, thus yielding the proper next state. In this manner, the next state table and the corresponding table of pointers, which are addressed by state, is generated for a regular expression. That is, next state table generator 216 works through the state machine and alphabet.

FIG. 6A illustrates the concept of 1-closure and 2-closure. This example begins from the 0 state. The 1-closure states for this example are 1, 2, 3, and F (where F is a failure state). The 2-closure for this example are 1, 4, 5, 6, 7, 8, and F.

FIGS. 8 to 12 are program flow diagrams for a compiler program which generates character lookup tables in accordance with the above described algorithm. Stated differently, FIGS. 8 to 12 describe a compiler which automatically generates a particular set of lookup tables 310 in order recognize a particular regular expression. The nomenclature used in FIGS. 8 to 12 is as follows:

"b" represents a particular byte position.
"M" is the number of bytes being processed in parallel.
"s" represents a particular state.
"L" is the number of states.
The bytes are numbered "0" to "M−1."
The states are numbered "0" to "L−1.
Lookup table(b, s) means the lookup table for byte b state s.
Cb, s means closure list for byte b state s
Tb, s means the alphabet transition list for closure list Cb, s
Ab, s means the alphabet map generated from transition list Tb, s First a DFA to recognize the particular expression of interest is generated using conventional compiler techniques. The DFA may be generated by any of the techniques known in the art for generating DFAs. For example see, a book by A. V. Aho, R. Sethi, J. D. Ullman, entitled "Compilers, Principals, Techniques and Tools," published by Addison-Wesley, Reading, Mass., 1986, or a book by A. W. Appel, entitled "Modern Compiler Implementation in C", which was published by Cambridge University Press, Cambridge, England, 1998.

The number of lookup tables needed depends upon the number of characters being recognized in parallel (four in the preferred embodiment shown in FIG. 4A) and the number of states in the resulting state machine (thirty two in the specific example provided for recognizing the expression "raqia"). For each state, there is one table for each character position.

Initially as indicated by block 801, b and s are both set to zero. A table is then generated as indicated by block 803. Flow diagrams for a program that performs the operation indicated by block 803 are given in FIGS. 9 to 12.

After the first table is generated, the value of b is incremented as indicated by block 804. If b is less than or equal to (M−1) the process repeats to generate the next table as indicated by block 805. If b is greater than (M−1) the value of s is incremented as indicated by block 807, and the process repeats as indicated by block 808, until s is greater than (L−1).

Figure 8:
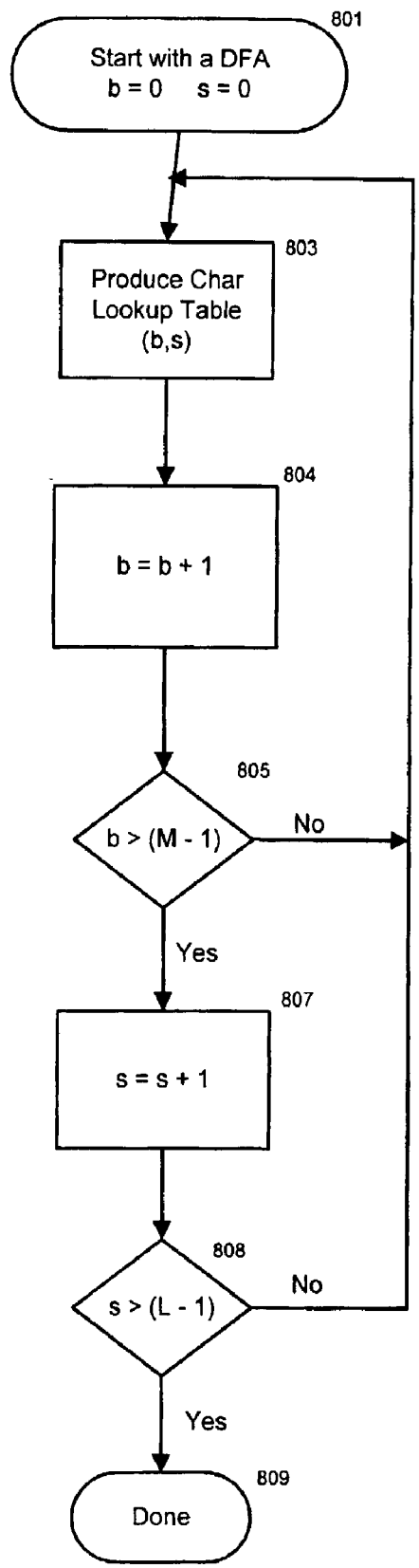
FIG. 8 is a program flow diagram showing how character look up tables are generated.
Figure 9:
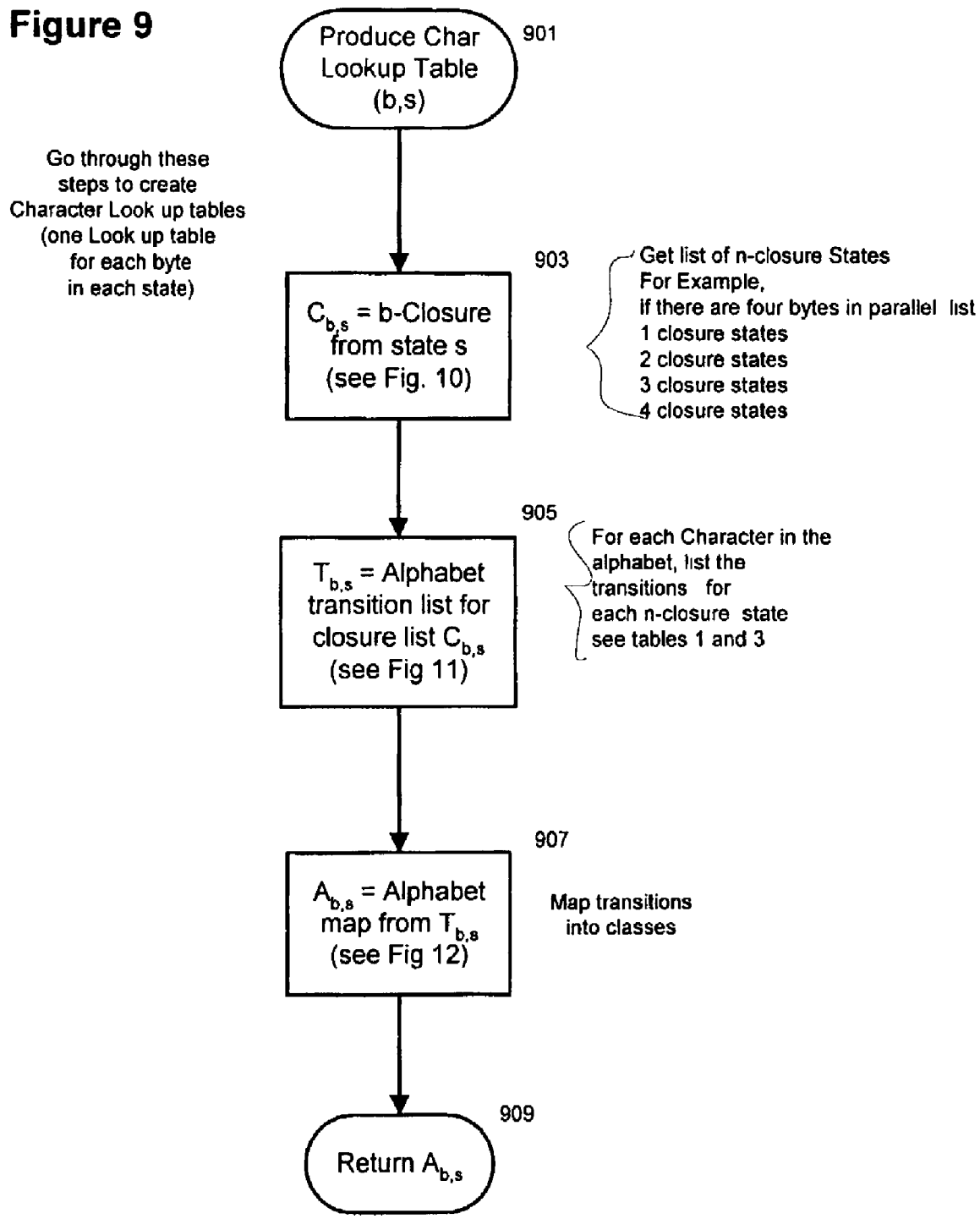
FIG. 9 is a program flow diagram showing generation of a one character look up table.

The generation of each character table (block 803) proceeds as indicated in FIG. 9. Block 901 indicates that the process shown generates a lookup table (b, s), that is, a lookup table for byte position b and state s. As indicated by FIG. 8, the process shown in FIG. 9 is repeated once for each byte in each state. Thus each pass through blocks 903, 905 and 907 generate the lookup table for one byte position in one state.

First as indicated by block 903, the n-closure list $C_{b,s}$ for byte b and state s is generated. The b-closure list is calculated where "b" is the number of the byte and ranges from 1 to M. If for example four bytes are being recognized in parallel, the one closure states, the two closure states, the three closure states and the four closure states are calculated. With respect to the previous example 650 that is shown in FIG. 6, the 1-closure list for state 0 is (states 1, 2, 3, F) and the 2-closure list from state 0 is (states 1, 4, 5, 6, 7, 8, F). A flow diagram for the process of creating the closure lists is given in FIG. 10.

Figure 11:
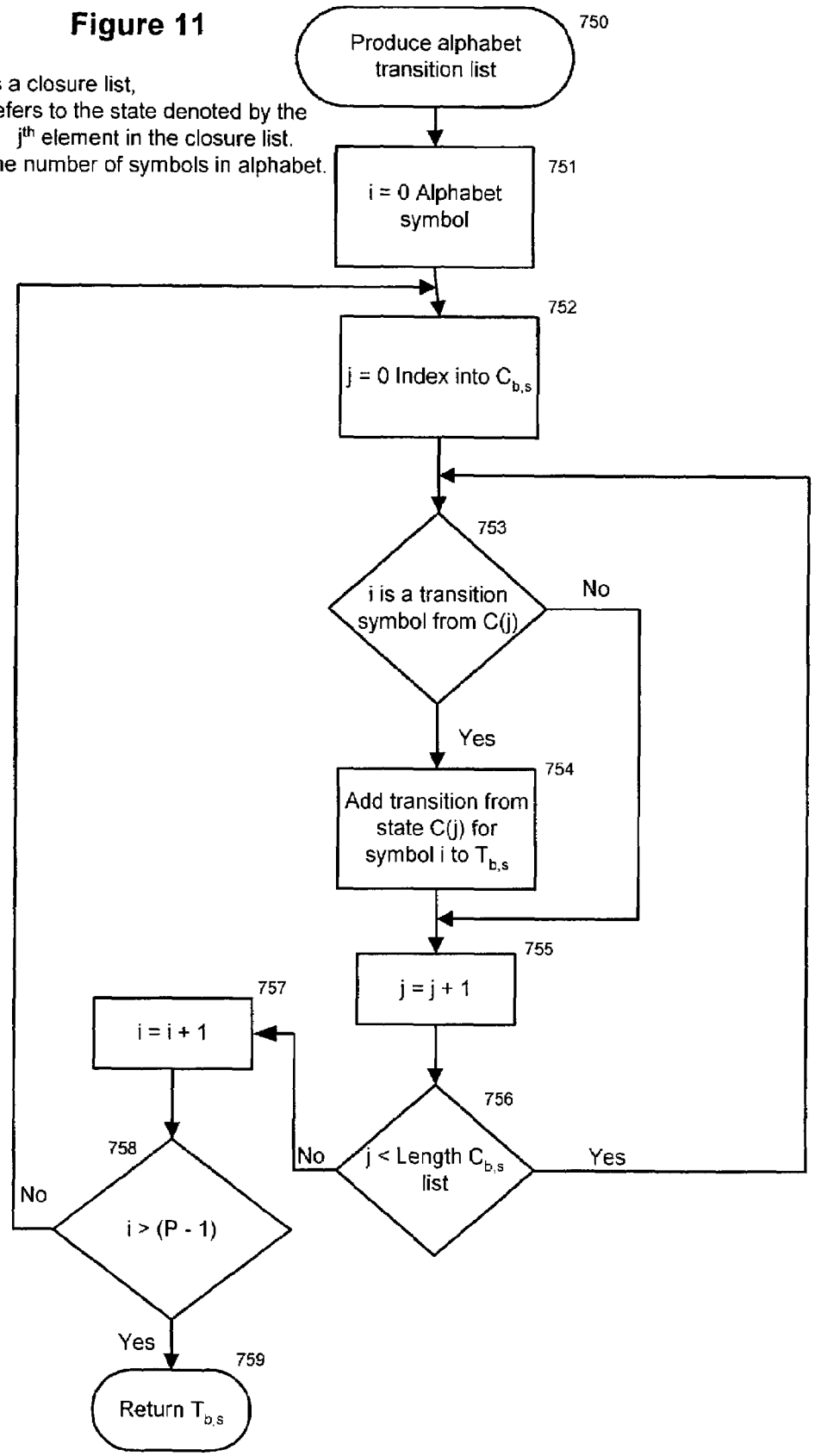
FIG. 11 is a program flow diagram showing how the alphabet transition list is generated.

Next as indicated by block 905 the Alphabet transition list T.sub.b,s is generated for the closure list C.sub.b,s A program flow diagram for creating the transition list T.sub.b,s is given in FIG. 11. For the particular state and particular byte under consideration, block 905 makes a list giving the transitions for each character in the alphabet. An example of this is the previously given tables 1 and 3.

Finally the alphabet map $A_{b,s}$ giving the class list is generated for the byte b and state s. The details of how this is done are given in FIG. 12.

Figure 10:
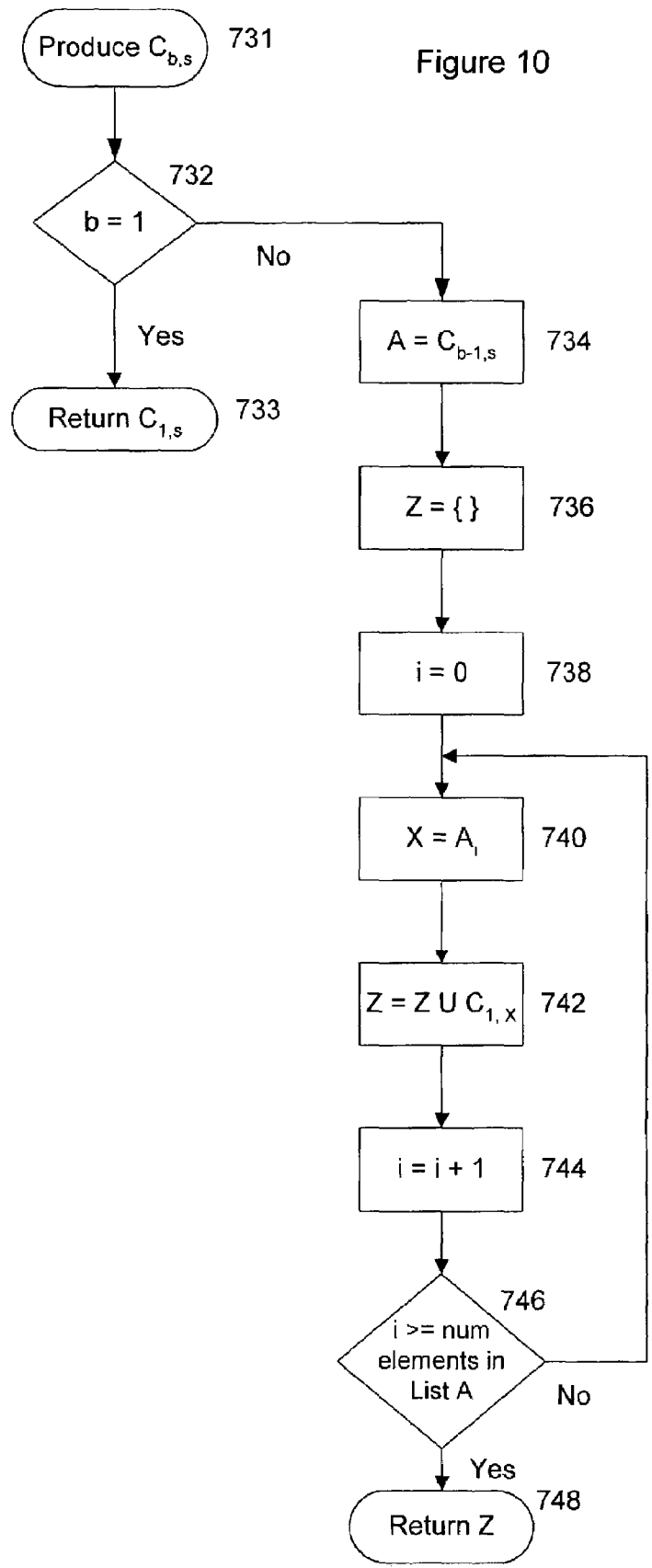
FIG. 10 is a program flow diagram showing how the n-closure list is generated.

FIG. 10 shows the process for generating the n-closure list for a particular state s. A basic function in this calculation is $C_{1,s}$ which is the '1-closure' from state s. The 1-closure from a given state is simply the list of states reachable in a single transition from state s. The decision block 732, checks if 1-closure is to be computed and if so block 733 returns $C_{1,s}$. If the closure is greater than one, then block 734 is entered where the (n−1)-closure list for state s, is generated by a recursive call. The (n−1)-closure list for state s, is called 'A'. An empty set is initialized in block 736 and called 'Z'. Block 738 initializes a loop counter 'i' which is checked for loop completion in decision block 746. This loop in turn, selects the ith element of the (n−1)-closure list and calls it 'X' in block 740. Then in block 742 the 1-closure from state X is computed and unioned with the set 'Z'. Block 744 increments the loop counter. When the loop is exited the routine returns the set Z.

FIG. 11 shows a block flow diagram for a program to calculate the transition list as indicated by block 905 in FIG. 9. This transition list has for each symbol in the alphabet a complete list of transitions (start and end state for each transition) that may occur for the specified closure. The algorithm uses the DFA and closure list of states, $C_{b,s}$. As indicated in FIG. 11, each symbol of the alphabet is checked to see if it has a transition out of each state in the closure list $C_{b,s}$. The comparison starts with symbol 0 as indicated by block 751 and proceeds through the symbols in a look through blocks 755 and 756. Blocks 753 and 754 indicate that where a transition for the symbol under examination is found, an entry is made in the alphabet transition list for that symbol. This entry contains the alphabet symbol on which a transition occurs, the state from which the transition occurs and the state into which the transition leads. It is noted that there may be null or failure states as shown in tables 1 and 3, meaning that there were no transitions out of a state for a particular symbol. The process proceeds through blocks 757 and 758 until each of the symbols has been examined and all the transitions they cause noted in the transition list $T_{b,s}$.

Figure 12:
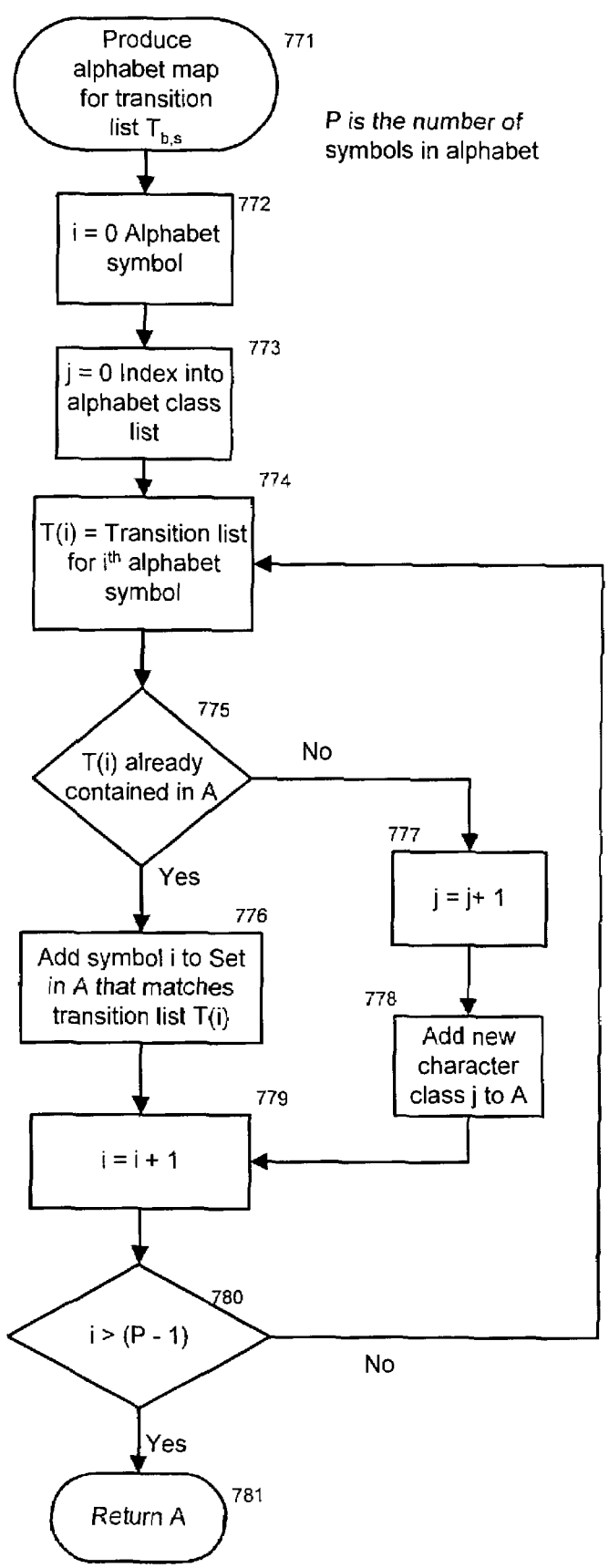
FIG. 12 is a program flow diagram showing how the transitions are grouped into classes.

FIG. 12 is a block diagram for producing the alphabet map for the transition list. That is, FIG. 12 indicates how the symbols in an alphabet are arranged in classes. Blocks 772 and 773 indicate that the process proceeds through the entire alphabet. Blocks 774 to 779 either add the character being considered to an existing alphabet class or a new class is created. Block 780 is a test that makes the process loop until all the symbols in the alphabet have been considered.

The following is an explanation of the invention from a somewhat different perspective: The purpose of the invention is high speed recognition of patterns in a data stream. The patterns are described by 'regular expressions', which means they may be quite general. For example, the regular expression to detect filenames prefixed by 'binky' or 'winky', containing 'xyz' and having a filename extension '.jpg' are found by the regular expression:

(binky|winky).*xyz.*\.jpg

The RDFA (i.e. the present invention) can search for patterns at fixed locations (anchored), as needed for IP packet filtering, but it can also locate unanchored regular expressions anywhere in a packet payload.

The RDFA has other very important features and advantages over a conventional DFA. It allows parallel processing of bytes. This is important in high speed applications such as OC-192 transport layers, where four bytes arrive from the framer at time. A conventional DFA cannot be easily implemented at OC-192 rates with presently available memory speed, cycle time, and logic delay time limitations.

Another advantage is that the RDFA has memory requirements that can be precomputed for a particular set of patterns to be recognized. Finally, the design allows convenient separation of the algorithm between on and off-chip memory when expression complexity becomes large.

The use of pointers to next state tables, rather than directly using the alphabet table lookup results, allows flexibility in memory management. For example, in embodiments that have on-chip and off-chip memory, pointers can be used so that more frequently used memory is on-chip, to speed up RDFA performance. The expression compiler can determine the amount of memory required. This allows the user to know if a particular set of rules will fit in the on-chip memory. Thus, memory related performance can be accurately known ahead of time.

The preferred embodiment requires memory lookup operations to process the 4 bytes. Specifically, the memory lookups are:

1. Parallel lookup of each incoming byte from the data stream.
2. Lookup of the number of bits width for each alphabet lookup result based on state.
3. Lookup of pointer for next-state table based on current state.
4. Lookup of next state.

These memory operations may be pipelined to allow effective processing times limited by the longest memory access. Another advantage of the approach is seen when its memory requirements are compared with a simple DFA approach applied to processing 4 bytes in parallel. A simple approach to DFA parallelization, does a lookup on the 4 bytes in parallel This will match the speed of the RDFA, but requires a table of size 232 entries, which has 4.295 billion entries and a cycle time of 3.2 nS in order to keep up with OC-192 rates (10 Gb/sec). Such a system is difficult to implement with current or near-term memory technology, based on the speed and size required. Further, such a large memory is difficult to implement on-chip with the RDFA processing algorithm.

An Important feature of RDFA: An important property of the RDFA is that the bytes in the data stream are treated as letters in an alphabet and are mapped to character classes. In general, many characters map to a single class, greatly reducing the number of bits necessary to represent an alphabet symbol. As a consequence, when multiple characters are concatenated together and used for a next-state table lookup, the size of the next-state table is greatly reduced, when compared with concatenation of multiple bytes.

Important Hardware Implementation Feature: The RDFA has many applications, some involving searching full packets for unanchored expressions. The system (i.e. the engine) described above, is well suited to this application. Another application is searching fixed headers for patterns. A special feature incorporated into the RDFA is a programmable data stream bit mask, where each bit corresponds to a sequential word in the input data stream of a packet. For example, an ethernet packet containing 1500 bytes contains 375 words, and a 375 bit mask allows complete freedom in selection of words to be processed. When a bit is set on in the data stream mask, the corresponding word is fed to the RDFA. If the bit is turned off then the corresponding word is not seen by the RDFA. This allows a front end filter that operates at line rate which greatly reduces the load on the RDFA when processing fixed position header information. Further, this can lead to reductions in the complexity and memory used by the RDFA. With the above described mask only a small subset of the data stream must be processed and the data that is processed can be handled in a simpler manner, which in turn means larger rule sets can be used for a given amount of memory.

Reduction of Table Sizes: The RDFA requires a set of alphabet lookup up tables and a next state table for each state. If the number of states can be reduced, then the size of the lookup tables can be reduced. In a classic DFA, when M characters are processed the state machine transitions through M states. For an RDFA it is recognized that processing M bytes in parallel can be treated as a black box, transitioning between two states. For example, as shown in FIG. 7A, the character string 'abcdefgh' is intended to be matched. Not counting initial state, a classic DFA has 8 internal states through which it transitions including the acceptor state. However, if 4 bytes are processed in parallel, then only 2 states are needed to represent the transitions as shown in FIG. 7B. Note that this is a special case since cyclic graphs, representing wild-cards or arbitrary numbers of character repetitions, may not occur in this type of processing. It is noted that The RDFA compiler can also determine the memory requirements for RDFA system data associated with a defined regular expression.

The RDFA system may be employed in any of a variety of contexts where it is essential or desirable to determine satisfaction of a regular expression, whether anchored or unanchored, in a data stream, particularly when such determinations are to be made at high speeds, such as required by OC-192 rates. The RDFA system may also be employed in contexts where consumption of relatively small amounts of memory by the RDFA system data are required or desirable.

The invention may be embodied in other specific forms without departing from the spirit or central characteristics thereof. While not discussed in detail, incoming data may be evaluated against a plurality of regular expressions simultaneously. In such a case, entering a failure state for one regular expression state machine only terminates processing with respect to that regular expression. The present invention may also be implemented in any of a variety of systems, e.g., to detect a computer virus in e-mail. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A method for generating lookup tables in a computer-readable medium for a regular expression recognition engine which recognizes a plurality of characters in parallel, said characters being from an alphabet, said method comprising:
   generating a Deterministic Finite State Automaton (DFA) state machine to recognize characters of a regular expression;
   generating a n-closure list for each character byte position n and for each state s in said DFA state machine;
   generating an alphabet transition list for each entry on said n-closure list;
   generating a limited set of classes by mapping into same class characters which have a same set of transitions for each byte position n and state s;
   generating a look up table, for each state s and byte position n, said table having one value for each member of said alphabet, said values consisting of members of said limited set of classes; and
   saving said look up table in the computer-readable medium.

2. The method recited in claim 1 wherein said limited set of classes are used to identify a next state of said state machine.

3. The method recited in claim 1 wherein said n-closure list is a list of states reachable in n transitions from a particular state.

4. The method recited in claim 1 wherein said alphabet transition list is a list of the transitions out of a particular state for each of the characters in said alphabet.

5. The method recited in claim 1 where x characters are examined in parallel and wherein the n-closure list is generated for values of n up to the value x.

6. The method recited in claim 1 wherein said DFA state machine is optimized.

7. The method recited in claim 4 wherein x characters are examined in parallel and wherein the n-closure list is generated for values of n up to the value x.

8. The method recited in claim 1 wherein x characters are examined in parallel and wherein said regular expression recognition engine has m states, and wherein x times m look up tables are generated.

9. A method for generating state look up tables in a computer-readable medium for a Real-time Deterministic Finite Automaton (RDFA) state machine that recognizes characters in a regular expression of characters in an alphabet, said method comprising:
   examining a plurality of characters in parallel by the RDFA;
   generating a Deterministic Finite Automaton (DFA) state machine to recognize characters of said regular expression;
   generating a n-closure list for each character byte position n and for each state s in said DFA state machine;
   generating an alphabet transition list for each entry on said n-closure list;
   generating a limited set of classes by mapping into same class characters which have a same set of transitions for each byte position n and state s; and
   generating a look up table, for each state s and byte position n, said table having a plurality of values including one value for each member of said alphabet, said values consisting of members of said limited set of classes, whereby said look up tables comprise said state look tables for said RDFA and whereby the size of said state lookup tables is smaller than the size of the look up tables in said DFA machine; and saving said look up table in the computer-readable medium.

10. The method recited in claim 9 where n characters are examined in parallel and the n-closure list is generated for values of n up to the number of characters being examined in parallel.

11. The method recited in claim 9 wherein said DFA state machine is optimized.

12. The method recited in claim 9 wherein n characters are recognized in parallel and wherein said state machine has m states, and wherein n times m look up tables are generated.

13. A method of generating next state look up tables in a computer-readable medium for a multi bit Real-time Deterministic Finite Automaton (RDFA) which recognizes a regular expression which consists of characters from an alphabet, said method consisting of the steps, generating a Deterministic Finite Automaton (DFA) state machine which recognizes said characters;

generating a n-closure list for each byte position for each state in said DFA machine;

generating an alphabet transition list for each n-closure list;

generating a limited set of classes by mapping into same class characters which have a same set of transitions for each byte position n and state s; and generating lookup tables for said RDFA utilizing said classes, whereby said RDFA has less states than said DFA; and saving said look up tables in the computer-readable medium.

14. The method recited in claim 13 where n characters are examined in parallel and the n-closure list is generated for values of n up to the number of characters being examined in parallel.

15. The method recited in claim 13 wherein said DFA state machine is optimized.

16. The method recited in claim 13 wherein n characters are examined in parallel and wherein said state machine has m states, and wherein n times m look up tables are generated.

17. A system for generating look up tables in a computer-readable medium for a state machine that recognizes a regular expression of characters in an alphabet, said recognition examining a plurality of characters in parallel, said method comprising:

means for generating a Deterministic Finite Automaton (DFA) state machine to recognize characters of a regular expression;

means for generating a n-closure list for each character byte position n and for each state s;

means for generating an alphabet transition list for each entry on said n-closure list;

means for generating a limited set of classes by mapping into same class characters which have a same set of transitions for each byte position n and state s; and means for generating a look up table, for each state s and byte position n, said table having a plurality of values including one value for each member of said alphabet, said values consisting of members of said limited set of classes, whereby a size of the lookup tables is smaller than a number of characters in said alphabet under consideration; and means for saving said look up table in the computer-readable medium.

* * * * *